United States Patent [19]

Kohno et al.

[11] Patent Number: 5,271,445
[45] Date of Patent: Dec. 21, 1993

[54] PNEUMATIC TIRE INCLUDING WAVE-SHAPED CORDS OR FILAMENTS

[75] Inventors: Yoshihide Kohno; Kuninobu Kadota; Hiroyuki Koseki, all of Kodaira; Norinaga Matsushita, Akishima, all of Japan

[73] Assignee: Bridgestone Corporation, Tokyo, Japan

[21] Appl. No.: 829,537

[22] Filed: Feb. 3, 1992

Related U.S. Application Data

[63] Continuation of Ser. No. 409,188, Sep. 19, 1989, abandoned.

[30] Foreign Application Priority Data

Sep. 19, 1988 [JP] Japan ................................. 63-232253
Nov. 21, 1988 [JP] Japan ................................. 63-292272

[51] Int. Cl.⁵ .......................... B60C 9/18; B60C 9/20; B60C 9/22
[52] U.S. Cl. ........................ 152/527; 152/526; 152/531
[58] Field of Search ............ 152/526, 527, 531; 428/295, 369; 136/177, 179, 437, 439, 440

[56] References Cited

U.S. PATENT DOCUMENTS

| | | | |
|---|---|---|---|
| 1,657,829 | 1/1928 | Hopson | 156/437 X |
| 1,800,179 | 4/1931 | Darrow | 152/527 X |
| 2,982,328 | 5/1961 | Emanueli et al. | |
| 3,126,042 | 3/1964 | Cegnar | 152/534 |
| 3,904,463 | 9/1975 | Boileau | |
| 4,219,601 | 8/1980 | Inoue | 152/527 |
| 4,402,356 | 9/1983 | Musy | 152/531 |
| 4,445,560 | 5/1984 | Musy | 152/531 |
| 4,820,143 | 4/1989 | Eroskey et al. | 156/440 X |
| 4,934,428 | 6/1990 | Aoki et al. | 152/537 X |
| 4,981,542 | 1/1991 | Carrier | 152/527 X |
| 5,004,031 | 4/1991 | Kadota et al. | 152/534 |
| 5,009,732 | 4/1991 | Ikeda et al,. | 156/177 |
| 5,054,532 | 10/1991 | Kohno et al. | 152/527 |

FOREIGN PATENT DOCUMENTS

| | | | |
|---|---|---|---|
| 220309 | 6/1958 | Australia | 152/527 |
| 242595 | 1/1963 | Australia | 152/527 |
| 545753 | 3/1956 | Belgium | |
| 2501126 | 9/1982 | France | 152/527 |
| 64-6187 | 10/1989 | Japan | |
| 39277 | 12/1960 | Luxembourg | |
| 0815055 | 6/1959 | United Kingdom | |
| 2009270 | 6/1979 | United Kingdom | |
| 2092963 | 8/1982 | United Kingdom | |
| 2092964 | 8/1982 | United Kingdom | |

*Primary Examiner*—Michael W. Ball
*Assistant Examiner*—Adrienne C. Johnstone
*Attorney, Agent, or Firm*—Sughrue, Mion, Zinn, Macpeak & Seas

[57] ABSTRACT

A pneumatic tire includes a toroidal carcass anchored by at least a pair of bead cores and a belt having strips. The strip has as reinforcing elements a plurality of zigzag or wave-shaped cords or filaments arranged side by side around a crown of the toroidal carcass. The strip is coated with a high molecular weight material less in modulus of elasticity than the reinforcing elements. Waves of the reinforcing elements of the strips are arranged in width directions of the belt so that ratios of amplitudes to wave lengths of the waves are maximum at side edges of the belt. The ratios are preferably progressively increased toward the side edges of the belt. Ratios of amplitudes to pitches of the waves are 0.005-0.175 and ratios of pitches of the waves to maximum circumferential lengths when filled with a normal inner pressure is less than 0.025.

5 Claims, 8 Drawing Sheets

FIG_5a
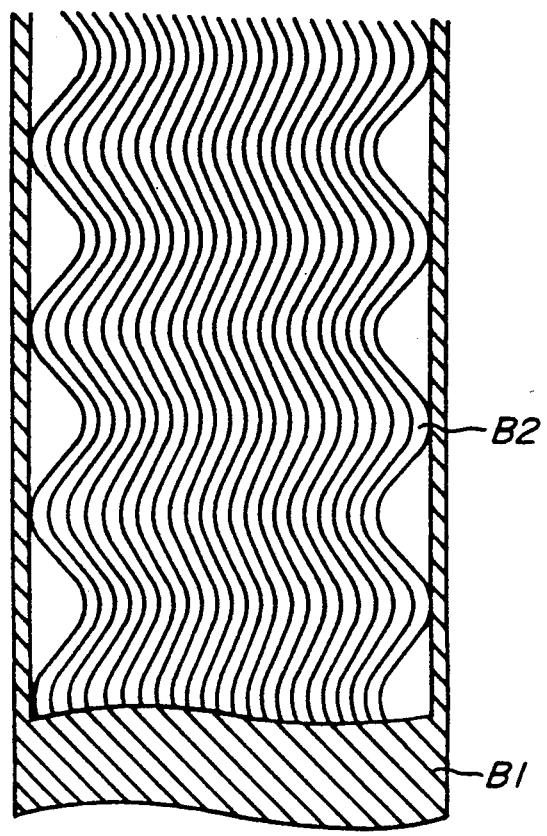
FIG_5b
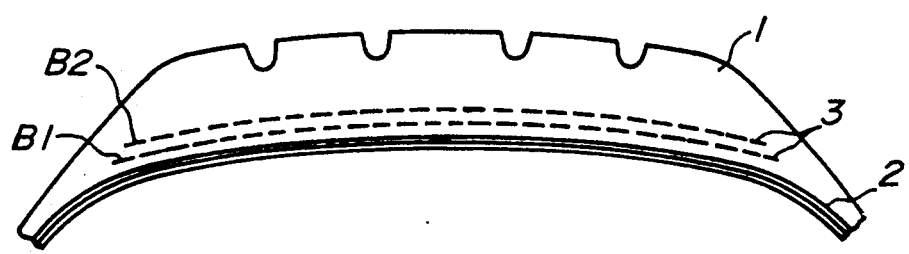

FIG_9
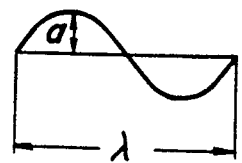
FIG_10
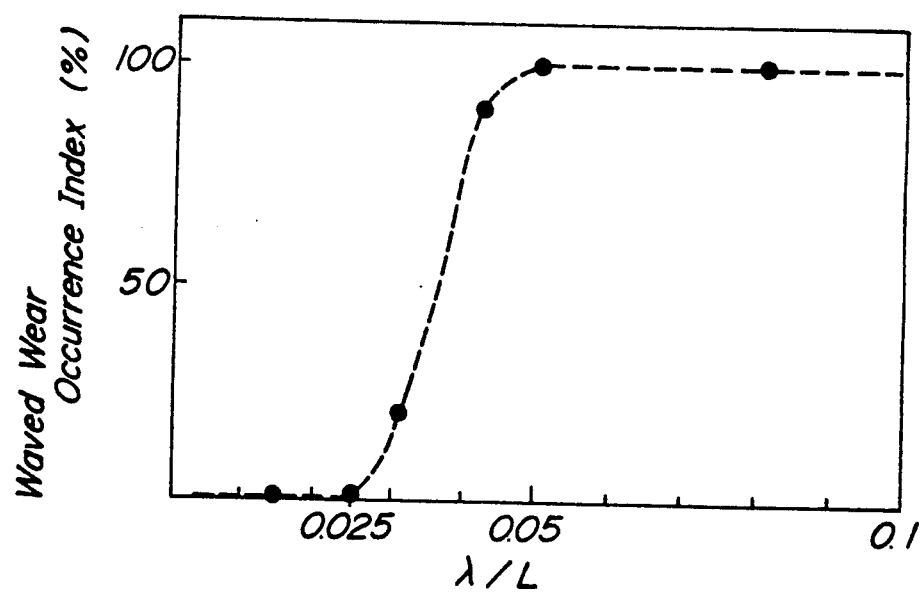

FIG_11a
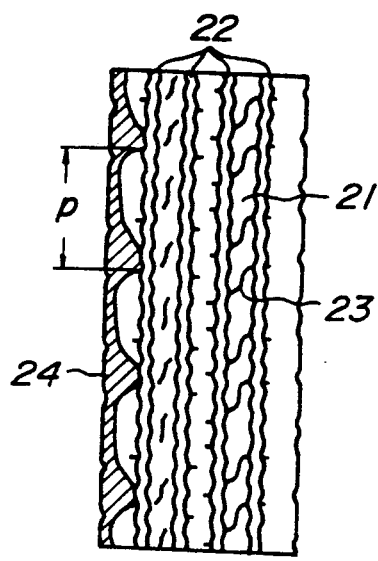
FIG_11b

PNEUMATIC TIRE INCLUDING WAVE-SHAPED CORDS OR FILAMENTS

This is a continuation of application Ser. No. 07/409,188 filed Sep. 19, 1989, now abandoned.

BACKGROUND OF THE INVENTION

This invention relates to a pneumatic tire, which improves durability of a belt reinforcing a crown of a carcass by effectively restraining irregular wear occurring at shoulders of a tread for the purpose of reinforcing the crown of the carcass. More particularly, it relates to a pneumatic tire which accomplishes a prolongation of wear-life of the tire by obtaining uniform perfect wear throughout a tread of the tire by effectively restraining irregular wear occurring at the tread.

In general, with pneumatic tires, outer diameters of both shoulders are smaller than those at centers to provide so-called "crown R" in order to insure maneuverable stability in cornering and to avoid excessive ground contacting pressure in a contacting surface at tread shoulders. As a result, however, the difference in circumferential length between the center and shoulders of the tread naturally becomes large so that slip occurs at the shoulders in rolling under loaded conditions. Therefore, both the shoulders prematurely wear in comparison with the center of the tread so that the difference in height therebetween will occur. This is an irregular wear at shoulders of the tread.

This problem will be solved or mitigated, if a belt or breakers as carcass crown reinforcing means adjacent the tread rubber are made readily extensible along an outer circumference of the tread. In this case, however, it may be difficult to maintain the shape of the tire when filled with inner pressure or transverse forces when cornering may become insufficient, so that requirements with respect to essential performances of tires may not be fulfilled.

Therefore, it is needed to effectively prevent the irregular wear occurring at treads of the pneumatic tires.

It has been attempted to modify rigidities of reinforcing elements such as belts or breakers corresponding to centers and shoulders of treads.

In such an attempt organic fiber yarns or metal wires, particularly steel wires are twisted to form reinforcing cords which are arranged in parallel and coated with rubber to form a rubber coated cord fabric. The rubber coated cord fabric is obliquely cut into fabrics which are arranged in layers intersecting at an equatorial plane of a tire, thereby reinforcing at a crown by the intersecting belt. In this case, the reinforcing cords continuously extend from one shoulder to the other. In order to modify the rigidity of the belt at the center and shoulder, the reinforcing layers are divided to make different angles of the respective cords of the divided layers or an additional reinforcing layer is added to the center of the belt.

In these methods, however, producing steps and numbers of parts increase for dividing the reinforcing layers and the addition of the additional layer with resulting lower productivity. In addition to disadvantage of the discontinuity in rigidity at locations of division and addition of the layers, separations at these locations are likely to occur owing to increase of stress concentration sources at ends of the cords. Accordingly, these methods are disadvantageous in durability of the belt or breaker.

FIG. 1 illustrates another example of reinforcing elements of the prior art, which are arranged intersecting with each other at angles of 20° with respect to an equatorial plane of a tire. In FIG. 2, reinforcing elements are arranged along an equatorial plane of a tire. These arrangements of the reinforcing elements are still insufficient to reinforce the crown of a carcass.

On the other hand, one of the important performances of tires is obtaining uniform wear of a tire in running. In practice, however, with heavy duty radial tires, uneven wear so-called "waved wear" is liable to occur on circumferences of the tires because of heavy loads in running.

In the event that strip layers having zigzag or wave-shaped cords or filaments as reinforcing elements are arranged particularly nearest to a tread of a tire, it has been found that waved wear is more likely to occur resulting from a relation between a shape of the reinforcing elements and tire circumferential length.

Any documents disclosing such a facts could not been found.

Waved wear lengths are, in most general cases, 0.05 L where L is a maximum circumferential length of the tire. This means that an inherent mode of waved wear occurrence is 0.05 L.

Therefore, waved wear occurs to an excessive extent under the inherent mode when pitch lengths of waves of zigzag or wave-shaped cords or filaments used as reinforcing elements are more than 0.05 L.

SUMMARY OF THE INVENTION

It is an object of the invention to provide an improved pneumatic tire which, in addition to prevention of irregular wear in its tread, reinforces the tread by novel carcass crown reinforcing means to provide required and sufficient uniform rigidity distribution of the tread without increasing additional members.

It is another object of the invention to provide a pneumatic tire which prevents irregular wear in its tread from occurring in using a belt including zigzag or wave-shaped cords or filaments as reinforcing elements by reinforcing the tread with the aid of particular reinforcing elements to improve belt durability and at the same time to prolong wear-life of the tire.

In order to accomplish the objects, in a pneumatic tire including a toroidal carcass anchored by at least a pair of bead cores, and belt having at least one strip, said strip having as reinforcing elements a plurality of either of wave-shaped cords and filaments arranged side by side around a crown of the toroidal carcass, said strip being coated with a high molecular weight material less in modulus of elasticity than the reinforcing elements. According to the invention waves of the reinforcing elements of the strip are arranged in width directions of the belt so that ratios of amplitudes to wave lengths of the waves are maximum at side edges of the belt.

In a preferred embodiment of the invention, the ratios of the amplitudes to wave lengths of the waves are progressively increased toward the side edges of the belt. In another embodiment, average axes of the reinforcing elements are substantially in parallel with an equatorial plane of the tire. In a further embodiment, the belt comprises at least two strips, at least two reinforcing elements of one strip cross at least two reinforcing, elements of the other strip and average axes of the reinforcing elements of all the strips are in the same directions.

The bead cores for anchoring the toroidal carcass are usually a pair of single beads for tires for general passenger cars, wagons, light trucks and two-wheeled vehicles, but are a plurality of pairs for large tires. This invention is applicable to all tires without any limitations. Therefore, the invention is applicable to tires having at least one pair of bead cores. Moreover, with plies of the toroidal carcass various kinds of organic fiber cords or metal cords, particularly steel cords can be selectively used as a body reinforcement of tires suitable for various objects.

In the last embodiment of the invention, ratios of amplitudes to wavelengths of the reinforcing elements are 0.005–0.175 and ratios of wavelengths to maximum circumferential lengths of the tire when filled with a normal inner pressure are less than 0.025.

In order that the invention may be more clearly understood, preferred embodiments will be described, by way of example, with reference to the accompanying drawings.

BRIEF DESCRIPTION OF THE DRAWINGS

FIGS. 5a and 5b are a development and a sectional view illustrating a further embodiment of the invention;

FIG. 9 is an explanatory view of a reinforcing element used in the invention;

FIG. 10 is a graph showing an effect of the ratio of pitches of waves of reinforcing elements to the maximum circumferential length on occurrence of wave wear; and FIGS. 11a and 11b are explanatory views showing the behavior of occurrence of the waved wear.

DESCRIPTION OF THE PREFERRED EMBODIMENTS

Figure 3A:
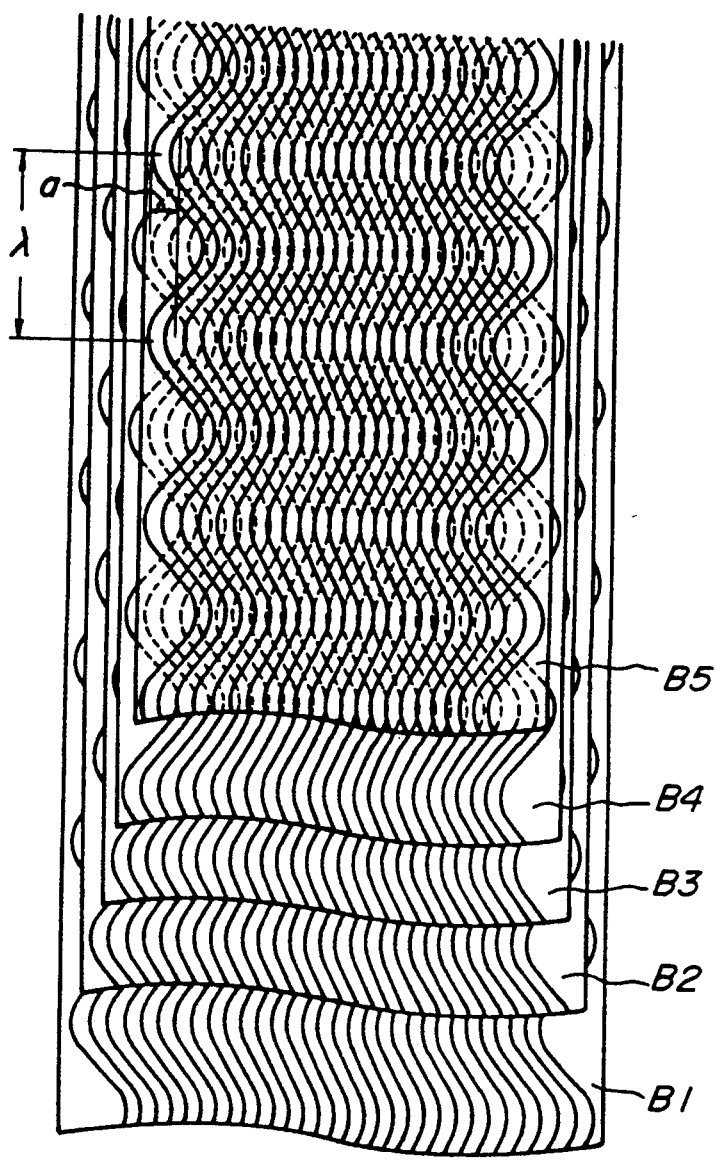
FIG. 3a is a development view illustrating one embodiment of the belt of the tire according to the invention.
Figure 3B:
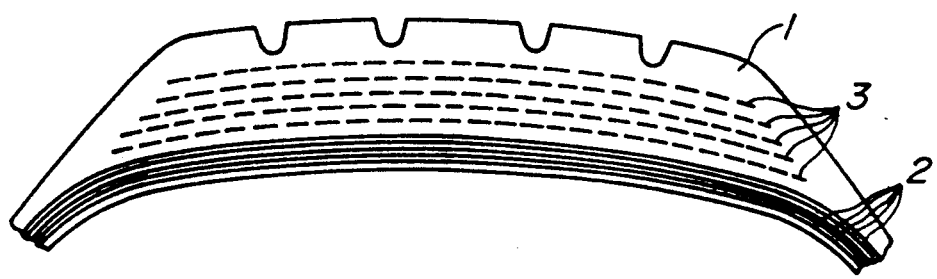
FIG. 3b is a sectional view illustrating a tread in which the belt shown in FIG. 3a is embedded.

FIGS. 3a and 3b illustrate the principal part of a tire according to the invention. The tire includes a tread rubber 1, a toroidal carcass 2 consisting of laminated layers, and a belt 3 as a reinforcement for a crown of the carcass 2. The belt 3 consists of five strips B1–B5 numbered in the order from the carcass 2 to the tread 1. These strips B1–B5 are coated with a high molecular weight material, usually a rubber, having a modulus of elasticity less than that of reinforcing elements of the strips of the belt in a usual manner.

In this case, the strips B1 and B2 have a plurality of cords or filaments as reinforcing elements which are wave-shaped or zigzag forms positioned in the layers of the strips. When configurations of the reinforcing elements are changed, angles between the reinforcing elements and average axes at intersecting positions thereof. The average axis is a center line of a reinforcing element, which divides distances between respective adjacent maximum and minimum peaks of the wave forms of the reinforcing elements and are along arranging directions thereof.

The larger the amplitudes a of the zigzag or wave forms of the reinforcing elements or the shorter the wave lengths $\lambda$ of the wave forms, the larger are the angles the above described. On the other hand, the smaller the amplitudes a or the longer the wave lengths $\lambda$, the smaller are the angles. The larger the angles between the reinforcing elements and the average axes, the lower the rigidity in directions of the average axes in the same manner as in cord angles of a belt made of a plurality of layers of rubber coated cords widely hitherto used which are obliquely cut and s arranged that cords intersect with each other. In other words, the larger the ratio $a/\lambda$ of the amplitude a to wave length $\lambda$, the lower is the rigidity in the directions of the average axes. The rigidity of the reinforcing elements can be changed by regulating configurations of the reinforcing elements in the form of wave or zigzag shapes in this manner.

Therefore, the rigidity distribution in one strip can be changed by changing the configurations of the reinforcing elements without additional reinforcing members. This is very effective in that rigidity can be changed without increasing ends of the reinforcing cords, in comparison with the conventional method of changing cord angles by dividing obliquely cut rubber coated cords. Moreover, by continuously changing configurations of reinforcing elements the rigidity can also be continuously changed so that and discontinuous change in rigidity can be mitigated. In case of the obliquely cut rubber coated cords being divided and arranged, separations are likely to occur at the divided positions. Such separations are completely prevented according to the invention. A suitable rigidity distribution can also be obtained depending upon required performance of the tire.

In the event that the cords or filaments in the form of waves or zigzag shapes are laminated crossing with each other in two layers as in a cross ply belt such that at least two cords or filaments of one layer cross at least two cords or filaments of the other layer, the average axes of all the cords or filaments being in the same direction, it is assumed that the ratio $a/\lambda$ is constant over width directions of the belt. In this case, if it is intended to increase the amplitude a for the purpose of decreasing the rigidity and the modulus of elasticity, enveloping property of the strips and hence the belt is improved to reduce the risk of cords being bent in cornering, but the rigidity of the strips is lowered too far so that sufficient maneuverability cannot be obtained in cornering. On the other hand, when the ratio $a/\lambda$ is reduced, there is a tendency of the cords to be bent and risk of separations is increased at ends of the cords.

Therefore, the ratio $a/\lambda$ of the zigzag or wave shapes of the reinforcing elements of the strips is distributed in width directions so as to progressively increase toward the side edges of the belt and be maximum thereat according to the invention. With this arrangement, both the rigidity and the enveloping property can be controlled. Therefore, according to the invention, while ensuring the required maneuverability of the tire, its durability can be improved by restraining the irregular wear.

EXAMPLES

Tires for aircraft

FIGS. 3a and 3b schematically illustrate a concrete embodiment of the invention for a tire of H 46×18.0 R 20. The belt 3 consists of five laminated rubber coated strips as reinforcing elements using aramid (Kevlar) cords (3000d/3). The belt 3 is embedded in the tread 1 for reinforcing the crown of the toroidal carcass 2. In this embodiment, the toroidal carcass 2 is of a radial construction using nylon cords (1890 d/3) and anchored about a pair of beads (not shown).

In FIG. 3a, each of the strips of the belt 3 is designated by B having a suffix 1-5 in the order of nearer to the carcass 2. Broken lines in wave designate reinforcing elements of the strip B4 immediately below the outermost strip B5 in order to show an intersecting of the reinforcing elements between the adjacent strips.

Figure 4A:
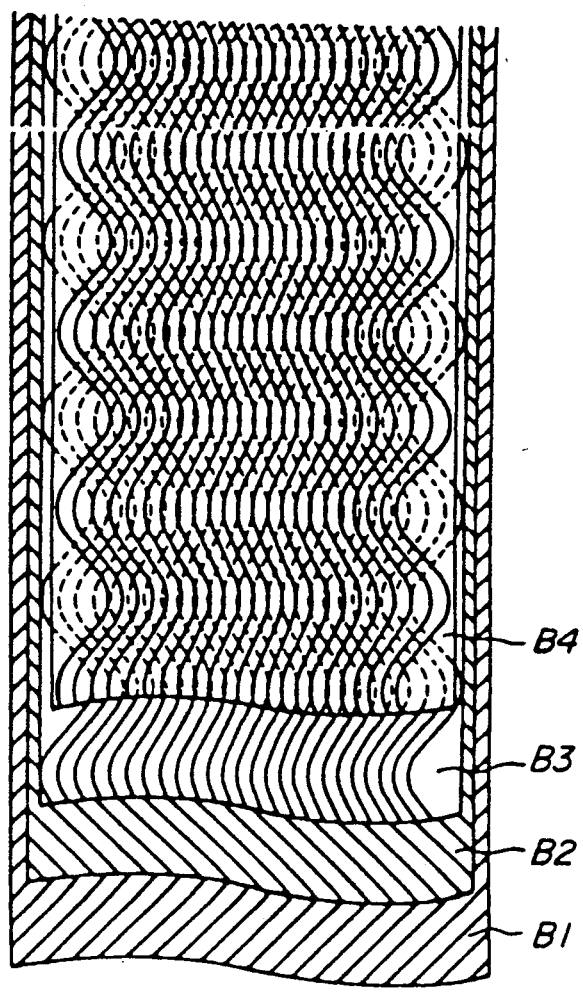
FIG. 4a is a development view illustrating another embodiment of the belt of the tire according to the invention.

The reinforcing elements in the embodiment are in wave shapes having at the center of the belt width 2 mm amplitude and 25 mm wave length or the amplitude to wave length ratio $a/\lambda = 0.08$. On the other hand, the ratio $a/\lambda$ is 0.16 at both ends of the belt 3. In this manner, the ratio becomes larger from the center to both the ends of the belt continuously. In this case, the amplitude a is a distance one half of a distance between peaks of the wave and the wave length is a pitch of the wave. As illustrated in FIG. 4a the strips B1-B4 comprising the belt 3 are all arranged on the same direction, i.e., circumferentially.

As described above, FIGS. 1 and 2 illustrates Comparative Examples 1 and 2 of the prior art using straight aramid (Kevlar) cords (3000d/3) as reinforcing elements the same in material as that of the above example.

Figure 1:
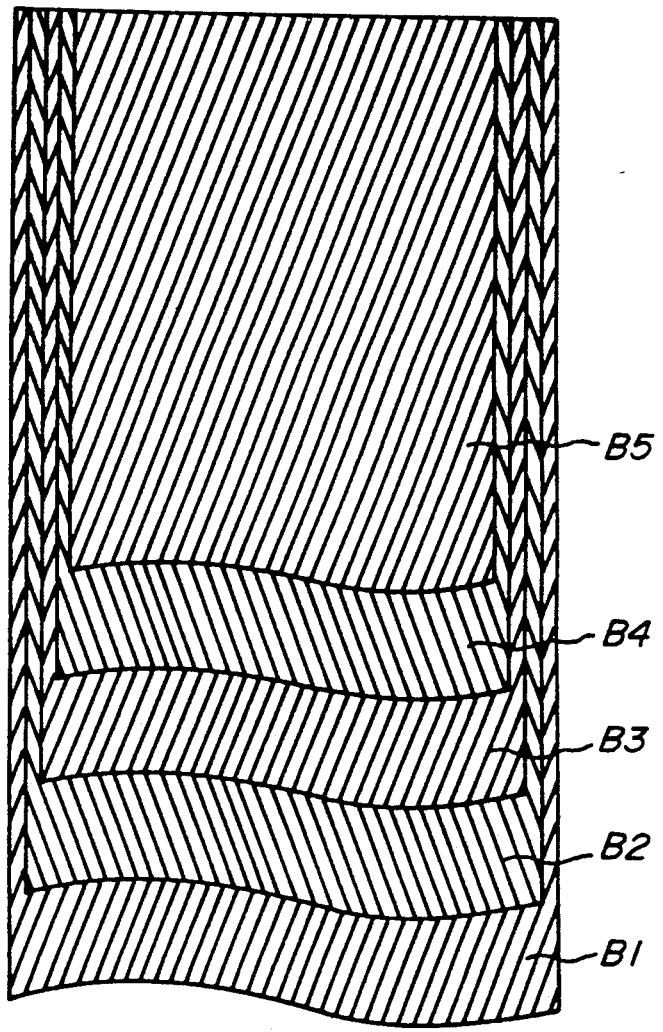
FIGS. 1 and 2 are development views illustrating of belts of the prior art, respectively.
Figure 2:
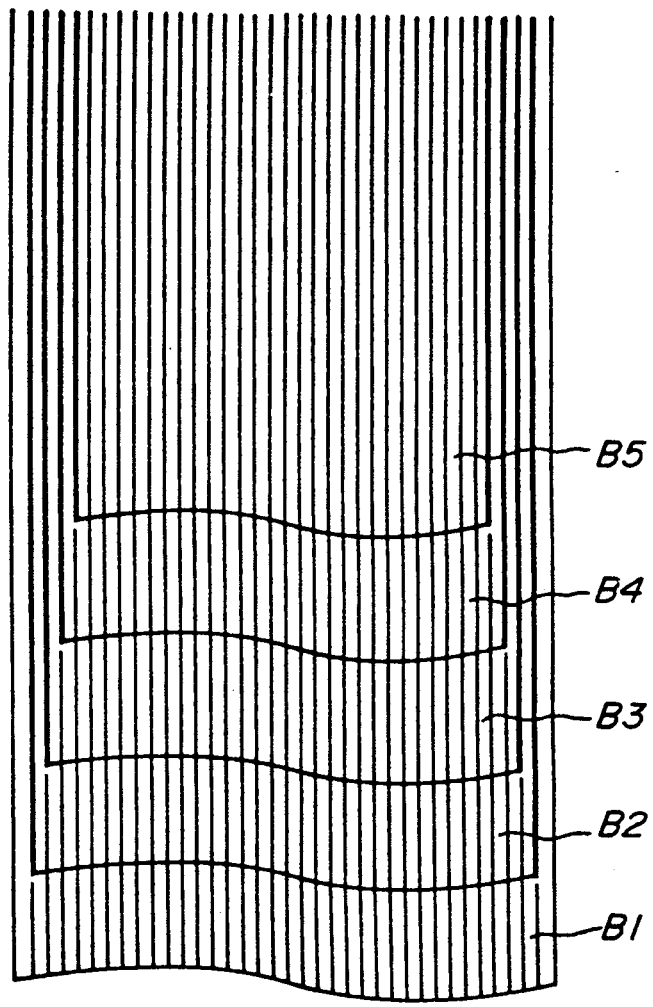

In Comparative Example 1 shown in FIG. 1, reinforcing elements are arranged intersecting with each other at angles of ±20° with respect to an equatorial plane of the tire. On the other hand, in Comparative Example 2 shown in FIG. 2, reinforcing elements are arranged along an equatorial plane of the tire.

A taking-off simulation used in a test was that a load was removed after raising speeds from 0 to 225 miles/hour according to the FAA standard. The simulations were repeated fifty times on the tires of the embodiment and Comparative Examples 1 and 2. Tires which had completely undergone the fifty times of the simulations were broken up to examine cracks at belts. Results are shown in Table 1 as durability of tires.

After wear promoting testing with a drum testing machine, amounts of wear of ribs (average depths of wear of ribs) at tread shoulders were measured and indicated as irregular wear by indexes assuming that amounts of wear of ribs at centers of treads were 100. The drum test had a drum onto which a tire was urged by a load and rotatively driven by the rotating drum. An index value nearer to the index 100 means that irregular wear at shoulders is effectively prevented to an extent near to wear at the center of the tread.

TABLE 1

| | Embodiment 1 | Comparative Example 1 | Comparative Example 2 |
|---|---|---|---|
| Durability of belt | Fifty times of simulations (no cracks at belt) | Failure at sixteen times (cracks at belt) | Fifty times of simulations (no cracks at belt) |
| Amount of wear at | 105 | Could not estimate due | 260 |
| shoulder rib (Index 100 at center rib) | | to separation | |

Tires for trucks and buses

Figure 4B:
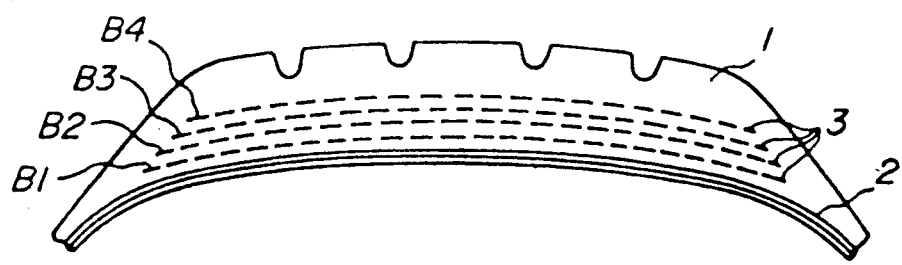
FIG. 4b is a sectional view illustrating a tread in which the belt shown in FIG. 4a is embedded.

FIG. 4 illustrates one embodiment of the invention of a tire of 10.00 R 20. A tread pattern of the tire was a four-circumferential groove pattern. A toroidal carcass 2 of the tire was of a radial construction using steel cords of 1×12×0.23 and anchored by a pair of bead cores (not shown).

A belt 3 of the tire was made of four rubber coated strips laminated using steel cords of 1×5. The strips B1 and B2 were arranged so that straight steel cords intersect with each other at 45° with respect to equatorial planes. On the other hand, the strips B3 and B4 included wave-shaped cords having amplitudes a of 0.75-1.8 mm and wave lengths $\lambda$ of 15 mm and having ratios $a/\lambda$ of 0.05 at centers of belts 3 and 0.12 at both the ends in a manner progressively increasing from the center of the belt to both the ends.

The strip B1 and B2 included wave-shaped cords having amplitude a of 0.75-1.8 mm and wave lengths $\lambda$ of 15 mm and having ratios $a/\lambda$ of 0.05 at centers of belts 3 and 0.12 at both the ends in a manner progressively increasing from the center of the belt to both the ends. The strips 3 and 4 were arranged so that cords intersect with each other at 45° with respect to equatorial planes. In this manner, tires of Embodiment 2 were prepared.

In order to compare with these tires, tires of Prior Art Examples 1 and 2 were prepared. Cord angles of strips B1, B2, B3 and B4 were +40°, +18°, −18° and −18°. In the Prior Art Example 1, cords of the strips B2 and B3 intersect with each other at equatorial planes. In this Prior Art Example 2, cords angles of strips B1, B2, B3 and B4 are 45°, 45°, 0° and 0° at equatorial planes and the cords of the strips B1 and B2 intersect with each other.

The tire to be tested was loaded with a load twice of the normal load and driven at a speed of 80 km/h with the normal inner pressure by means of the drum testing machine. Running distances when an failure had occurred were used as indications of durability.

Moreover, the tire was caused to run through 150,000 km with a load 240 kg and the normal inner pressure. Amounts of wear at tread shoulders were measured and indicated as irregular wear-resistances by index numbers assuming that amounts of wear at centers of treads were 100.

Results of the above test are shown in Table 2.

TABLE 2

| | Embodiment 1 | Embodiment 2 | Prior Art Example 1 | Prior Art Example 2 |
|---|---|---|---|---|
| Durability of belt | Complete run of 150,000 km | Complete run of 150,000 km | Separation of belt at 70,000 km | Complete run of 150,000 km |
| Irregular wear (amount of wear at shoulders) | 102 | 103 | 104 | 172 |

Moreover, with the tires of the Embodiments 1 and 2 and Prior Art Example 2, separations at belt ends did not occur because of large cord angles of reinforcing elements.

Tires for passenger cars

Tires of embodiment 2 were prepared as shown in FIGS. 5a and 5b, whose size was 175/70 SR 13 and tread pattern was a four-circumferential groove rib pattern. A toroidal carcass 2 was of a radial construction using nylon cords (1890d/3) and anchored by a pair of bead cores (not shown). A strip B1 of the belt was arranged at 45° with respect to an equatorial plane and used as reinforcing elements steel wires of 0.5 mm diameter. A strip B2 included wave-shaped cords having amplitudes a of 0.75 mm and wave lengths $\lambda$ of 15 mm and having ratios a/$\lambda$ of 0.05 at enters of belts 3 and 0.10 at both the ends in a manner progressively increasing from the center to both the ends of the belt. On the other hand, with tires of embodiment 3 a strip B1 was similar to the strip B2 of the embodiment 2 using wave-shaped steel wires and a strip B2 was similar to the strip B1 of the embodiment 2 using straight steel wires inclined at 45° with respect to an equatorial plane. In other words, the tire of the embodiment 3 is in a reverse relation of the strips B1 and B2 of the tire of the embodiment 2.

In order to compare with these tires, tires of Prior Art Examples 1' and 2' were prepared. The tire of the Prior Art Example 1' included strips B1 and B2 whose steel wires intersect with each other at 19° with respect to an equatorial plane of the tire. The tire of the Prior Art Example 2' whose steel wires of strips B1 and B2 intersect with each other at angles of 45° and 0° with respect to an equatorial plane.

The tire to be tested was loaded with a load twice of the normal inner pressure by means of the drum testing machine. In belt durability test, running distances when any failure had occurred were used as indications of durability.

Moreover, the tire was caused to run through 100,000 km with a load 390 kg with the normal inner pressure. Amounts of wear at tread shoulders were measured and indicated as irregular wear-resistance by index numbers assuming that amounts of wear at centers of treads were 100.

TABLE 3

| | Embodiment 2 | Embodiment 3 | Prior Art Example 1' | Prior Art Example 2' |
|---|---|---|---|---|
| Durability of belt | Complete run of 100,000 km | Complete run of 100,000 km | Separation of belt at 55,000 km | Complete run of 100,000 km |
| Irregular wear (amount of wear at shoulders) | 103 | 102 | 102 | 164 |

TIRES FOR TWO-WHEELED VEHICLES

Tires of 160/60 VR 18 for two-wheeled vehicles were produced which had belts whose reinforcing elements were arranged according to the invention, although toroidal carcass and bead constructions were similar to those of the prior art.

In this case, it was possible to produce tires in only one stage so that tire building efficiency was remarkably improved. In the prior art tires of this type required two stages for production.

Figure 6:
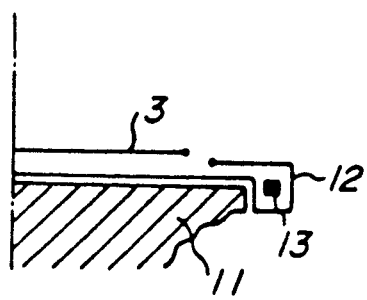
FIG. 6 is a sectional view illustrating a tire forming processes with another embodiment of the invention.
Figure 7:
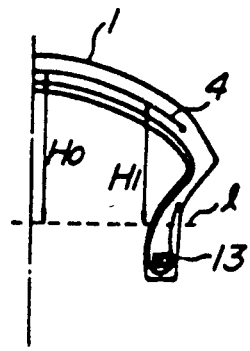
FIG. 7 is a sectional view of the tire shown in FIG. 6 in a vulcanizing process.

Referring to FIG. 6 schematically illustrating a green tire in section when it is being formed, a ply layer 12 for a carcass is wound in one turn on a flat former 11 and bead cores 13 are set on the ply layer. Ends of the ply layer 12 are turned up around the bead cores 13 and then a belt 3 is arranged in one layer on a center area of the ply layer 12. As described above, the belt 3 having a width of 180 mm includes rubber coated strips having wave-shaped reinforcing elements arranged side by side. Wave lengths and amplitudes of the reinforcing elements are 59 mm and 8.25 mm. These wave lengths and amplitudes are determined by the expansion H (whose rate is approximately 30%) in the proximity of a center of a tread in vulcanizing shown in FIG. 7. An expansion H1 in FIG. 7 illustrates the behavior in the proximity of shoulders. In forming the belt, the rate of H1 may be a value different from those in the center area of the belt 3 dependent upon belt rigidity at side areas of the tread. In this embodiment, the reinforcing elements of the belt 3 are all continuous and the wave lengths and amplitudes are equal at the beginning of forming.

A criterion of rate between H1 and H0 is indicated by 1 in FIG. 7.

Figure 8:
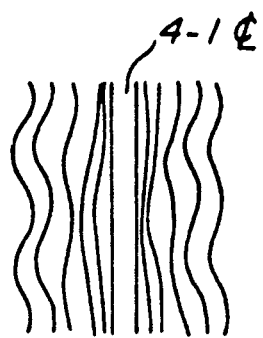
FIG. 8 is a development view of a belt for deformation of the belt.

When a green tire formed according to the process shown in FIG. 6 is vulcanized as shown in FIG. 7, the reinforcing elements of the belt 3 will be changed in configuration as shown in FIG. 8.

In other words, amplitudes of the reinforcing elements in the proximity of the center of the tread in a zone continuous to a location substantially along a circumference of the tire become considerably small. On the other hand, amplitudes of the reinforcing elements in the proximity of tread shoulders reduce only to the order of 5 mm.

Therefore, the amplitudes of the reinforcing elements progressively increase with increase in distance from an equatorial plane of the tire to the tread ends.

Tires of an embodiment of the invention were produced in consideration of those above described, whose strips using aramid cords (1500 d/2) a reinforcing elements were so arranged that widths of the strips were 93% of the tread width.

Moreover, tires of Prior Art 1" and 2" were prepared. The tires of Prior Art 1" are different in belt construction from but similar in others to those of the embodiment of the invention. The tire of Prior Art 1" included two strips intersecting with each other at 15° with respect to an equatorial plane of the tire. In the tires of Prior Art 2", reinforcing elements were spirally turned substantially along an equatorial plane throughout a zone of the belt 3.

The tires of the embodiment and Prior Art 1" and 2" were tested on their performance. Results are shown in Table 4 with index numbers assuming that those of the tires of Prior Art 1" are 100.

TABLE 4

| | Tire of Prior Art 1" | Tire of Prior Art 2" | Tire according to the invention |
|---|---|---|---|
| Straight running ability | 100 | 120 | 120 |
| Turning performance | 100 | 80 | 100 |
| High speed ability | 100 | 125 | 125 |
| Durability | 100 | 150 | 140 |

TABLE 4-continued

|  | Tire of Prior Art 1″ | Tire of Prior Art 2″ | Tire according to the invention |
| --- | --- | --- | --- |
| Productivity | 100 | 10 | 120 |

The performances in Table 4 are measured in the following manner.
(1) Straight running ability . . . maneuverability drum test and feeling in actual vehicle
(2) Turning performance . . . maneuverability drum test and feeling in actual vehicle
(3) High speed ability . . . high speed drum test
(4) Durability . . . durability drum test
(5) Productivity . . . time required to produce Although the belt 3 has been shown formed in one layer in this embodiment, it is possible to arrange two strips one upon the other with wave lengths being shifted one half pitch.

In order to reinforce the crown of the toroidal carcass, the tire according to the invention includes a belt of strips having wave-shaped or zigzag reinforcing elements whose amplitude to wave length ratios are distributed in width directions so as to be the maximum at side edges of the belt. Therefore, the rigidity of the tread is properly distributed considerably improving the various required performances of belt such as durability, irregular wear-resistance and the like.

In another embodiment of the invention, zigzag or wave-shaped reinforcing elements in at least one layer of strips forming a belt are arranged side by side in the layer. A ratio $a/\lambda$ of amplitude $a$ to pitch $\lambda$ is 0.005-0.175 and a ratio $\lambda/L$ of pitch $\lambda$ to maximum circumferential length $L$ when filled with the normal inner pressure is less than 0.025.

In this case, the tire construction is similar to those of the prior art with the exception of the belt, particularly zigzag or wave-shaped cords or filaments as reinforcing elements surrounding the crown of the carcass to reinforce the tread. As shown in FIG. 9 illustrating an example of wave-shaped steel cords (strand construction $3\times0.20+6\times0.38$), the ratio $a/\lambda$ is within 0.005-0.175 and a number of such reinforcing elements are arranged snugly side by side in a layer coated with a high molecular weight material, for example, rubber to form the strip for constituting the belt.

When it is intended to reinforce the tread by positioning near to it at least one layer of strips having zigzag or wave-shaped cords or filaments as reinforcing elements according to the invention, if the ratio $a/\lambda$ of the reinforcing elements is less than 0.005, the carcass can not be expanded or deformed into a toroidal shape in forming and vulcanizing so that depressions and protrusions would occur on inner surfaces of the tire. On the other hand, if the ratio $a/\lambda$ is more than 0.175, elongation of the circumferential length of the tire surface owing to filling with the normal inner pressure becomes too large so that the tread rubber at the tire surface is under tension, with the result that the wear-resistance and anti-cutting property are detrimentally affected to a great extent.

On the other hand, if the ratio $\lambda/L$ of the pitch $\lambda$ to the maximum circumferential length L when filled with the normal inner pressure is less than 0.005, loosening of twisted cords will occur to cause a risk of the cords being broken when the cords are formed in wave-shape.

Therefore, the ratio more than 0.005 is preferable. If it is more than 0.025, irregular wear is likely to occur because such a ratio is near a primary inherent mode of waved wear occurrence.

FIGS. 11a and 11b schematically illustrate the behavior of occurrence of waved wear. In the drawing, a tread 21 includes tread grooves 22 and sipes 23. Shaded portions 24 designate the waved wear.

Heavy duty tires of 10.00 R 20 were produced by way of trial. This tire included four strips made of steel cords as reinforcing elements having maximum width of 150 mm. Two strips among four on a side of the tread were rubber coated strip layers including wave-shaped steel cords (twisted construction $3\times0.20+6\times0.38$ 28 cords/50 mm) having pitches of 16-84 mm and amplitudes of 3.2-16.8 mm. On the other hand, two strips on a side of the carcass included straight cords intersecting with each other at 35° with respect to the equatorial plane.

With the reinforcing elements, the ratio $a/\lambda$ of the amplitude $a$ to the pitch $\lambda$ was 0.1 and the ratio $\lambda/L$ of the pitch $\lambda$ to the maximum circumferential length L was variable whose effect on the waved wear of the tread is shown in FIG. 10. With all the tires, the maximum circumferential lengths when filled with the normal inner pressure were 1,050 mm. Testing loads were 2,700 kg (normal load). The tires were equipped on a 10-ton truck and after running 50,000 km, waved wear was observed and compared in waved wear occurrence index.

The waved wear occurrence index 100 (%) in the ordinate in FIG. 10 indicates that waved wear occurs in all the circumferences of two front wheel tires of the 10-ton truck. For example, index 20% means that a ratio of the circumferential length in which the waved wear occurred to the total circumferential length of the two front wheel tires is 20%.

According to the embodiment, the belt durability is remarkably improved by suitably applying reinforcing elements of zigzag or wave-shaped cords or filaments. At the same time, irregular wear occurring in a tread is effectively prevented so as to accomplish the expected perfect wear to contribute to prolongation of wear-life of tires.

It is further understood by those skilled in the art that the foregoing description is that of preferred embodiments of the disclosed tires and that various changes and modifications may be made in the invention without departing from the spirit and scope thereof.

What is claimed is:

1. A pneumatic tire comprising; a carcass composed of at least one carcass ply toroidally extending between at least a pair of bead cores, and a belt composed of at least one strip, said strip having as reinforcing elements a plurality of wave-shaped or zig-zag-shaped cords or filaments arranged side by side around a crown portion of the carcass, wherein ratios of amplitude to wavelength in waves of said reinforcing elements in said strip progressively increase toward the side edges of said belt, and directions of said reinforcing elements arranged in said strip are in the same direction and substantially parallel to an equatorial plane of the tire.

2. A pneumatic tire as set forth in claim 1, wherein said belt comprises at least two strips having as reinforcing elements a plurality of wave-shaped or zig-zag-shaped cords or filaments, at least two reinforcing elements of one strip cross at least two reinforcing elements of the other strip and average axes of the reinforcing elements of all the strips are in the same direction.

3. A pneumatic tire as set forth in claim 1, wherein ratios of amplitude to pitches of waves of the wave-shaped or zig-zag-shaped cords or filaments are 0.005–0.175 and ratios of pitches of the waves to maximum circumferential lengths of the tire when filled with a normal inner pressure are less than 0.025.

4. A pneumatic tire according to claim 1 wherein said belt further comprises a second strip having cords or filaments arranged at a substantially constant angular orientation to an equatorial plane of said tire.

5. A pneumatic tire as set forth in claim 1, wherein said amplitude and wavelength of the wave-shaped or zig-zag-shaped cords or filaments are substantially constant in a circumferential direction of the tire in every reinforcing element.

* * * * *